(12) United States Patent
Pistagnesi et al.

(10) Patent No.: US 7,575,531 B2
(45) Date of Patent: Aug. 18, 2009

(54) ACTIVE TORQUE BIASING DIFFERENTIAL USING A VARIABLE VISCOSITY FLUID

(75) Inventors: Anthony H Pistagnesi, Tecumseh (CA); Frank T Frederick, Rochester, MI (US); Jeffrey Japinga, West Bloomfield, MI (US); Shawn E Bronner, Detroit, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 297 days.

(21) Appl. No.: 11/382,732

(22) Filed: May 11, 2006

(65) Prior Publication Data

US 2007/0265131 A1    Nov. 15, 2007

(51) Int. Cl.
F16H 48/20    (2006.01)
(52) U.S. Cl. ........................................ 475/231
(58) Field of Classification Search ................. 475/231
See application file for complete search history.

(56) References Cited

U.S. PATENT DOCUMENTS

| | | | |
|---|---|---|---|
| 4,896,754 A * | 1/1990 | Carlson et al. ............. 192/21.5 |
| 5,094,328 A * | 3/1992 | Palmer ....................... 192/21.5 |
| 5,469,947 A * | 11/1995 | Anzai et al. ................ 192/21.5 |
| 5,845,753 A | 12/1998 | Banbach | |
| 6,149,391 A * | 11/2000 | Pohl et al. ...................... 417/48 |
| 6,412,618 B1 | 7/2002 | Stretch et al. | |
| 6,428,441 B1 | 8/2002 | Hunt | |
| 6,454,674 B1 * | 9/2002 | Krzesicki et al. .............. 475/85 |
| 6,619,453 B2 | 9/2003 | Stretch | |
| 6,668,965 B2 * | 12/2003 | Strong ........................ 180/411 |

\* cited by examiner

*Primary Examiner*—Ha D. Ho
(74) *Attorney, Agent, or Firm*—Ralph E. Smith

(57) ABSTRACT

An active torque biasing differential includes a housing and an outer annulus disposed within the housing. An inner annulus is contained within the outer annulus. The inner annulus includes a plurality of slots. A plurality of vanes are disposed in the slots in the inner annulus. The vanes slidably contact the outer annulus. The vanes include a plurality of orifices formed therein. An electromagnetic coil is placed to apply a magnetic field to a chamber bounded by the outer annulus and inner annulus.

18 Claims, 5 Drawing Sheets

ACTIVE TORQUE BIASING DIFFERENTIAL USING A VARIABLE VISCOSITY FLUID

FIELD OF THE INVENTION

This invention relates generally to torque biasing devices. In particular, the invention relates to an active torque biasing differential using a variable viscosity (magnetorheological or electrorbeological) fluid.

BACKGROUND OF THE INVENTION

Limited slip differentials provide various degrees of torque transfer through the differential and many examples of limited slip differential are contained in prior art. Limited slip differentials are used in many power transmission devices including axles, transfer case units, all wheel drive units and transmissions. The complexity, size and weight of currently available torque biasing differentials limit their use and placement within many of these power transmission devices.

Torque sensing limited slip differentials require some degree of torque difference across the differential before the torque bias ratio of the differential is increased or decreased. Conversely, speed sensing limited slip differentials require some degree of speed difference across the differential before the torque bias ratio is increased or decreased. These requirements result in less than optimum compatibility with active traction enhancement and electronic stability control programming.

One limited slip differential described in prior art utilizes a clutch pack to transfer torque through the differential. In some applications of this design, the clamping action of the clutch pack increases as the input torque through the differential increases. In another example, as the speed difference through the differential increases, the differential case will spin and force a pressure ring out against the clutch plates thereby squeezing them together, increasing the torque transfer through the differential. The overall effect is to limit wheel spin when one of the tires is on a surface with lower available traction by transferring torque to the tire with greater available traction. One of the disadvantages of plate clutch type limited slip differentials is that the effectiveness of the device declines as the clutch packs wear. In addition, limited slip differentials using clutch packs are subject to chatter which results from a stick-slip condition occurring between the clutch plates.

Applications of torque biasing differentials include helical gear type differentials. A torque bias differential can increase the applied torque through the differential almost instantaneously. As the input torque increases the torque bias differential supplies a torque bias based on a fixed ratio that is a function of the design of the torque bias differential. This ratio cannot be altered without physically modifying the differential thereby limiting the torque bias differential's effectiveness as an active component in electronic stability systems and ABS systems.

Other torque biasing devices employing magnetorheological fluids require a pump to move the magnetorheological fluid through a tube or other external structure. Pumping of the magnetorheological fluid results in greater degradation of the magnetorheological fluid and increased wear within the system. In addition, the requirement of pumping the magnetorheological fluid increases the size and complexity of a torque biasing device as well as the system response time required achieve the desired torque biasing.

It is therefore desirable to provide an active torque biasing differential that overcomes the limitations, challenges, and obstacles described above.

SUMMARY OF THE INVENTION

One aspect of the present invention provides an active torque biasing differential that includes a housing and an outer annulus disposed within the housing. An inner annulus is contained within the outer annulus. The inner annulus includes a plurality of slots. A plurality of vanes are disposed in the slots of the inner annulus and slidably contact the outer annulus. The vanes include a plurality of orifices formed therein. An electromagnetic coil is placed to apply a magnetic field to a chamber bounded by the outer annulus and inner annulus.

Another aspect of the present invention provides an active torque biasing differential including a housing and an outer annulus disposed within the housing. An inner annulus is contained within the outer annulus and includes a plurality of slots formed therein. A plurality of vanes are disposed in the slots of the inner annulus and slidably contact the outer annulus. A chamber is formed between the inner annulus, the outer annulus. A plenum in fluidic communication with the chamber is machined within the outer annulus. An electromagnetic coil placed to apply a magnetic field to the chamber.

A third aspect of the present invention provides an active torque biasing differential that includes a housing. The housing includes a field producing coil for modifying a viscosity of a fluid. An outer annulus is disposed within the housing. An inner annulus is contained within the outer annulus and includes at least one vane for forcing the fluid through at least one orifice. The fluid is contained between the inner annulus and the outer annulus.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
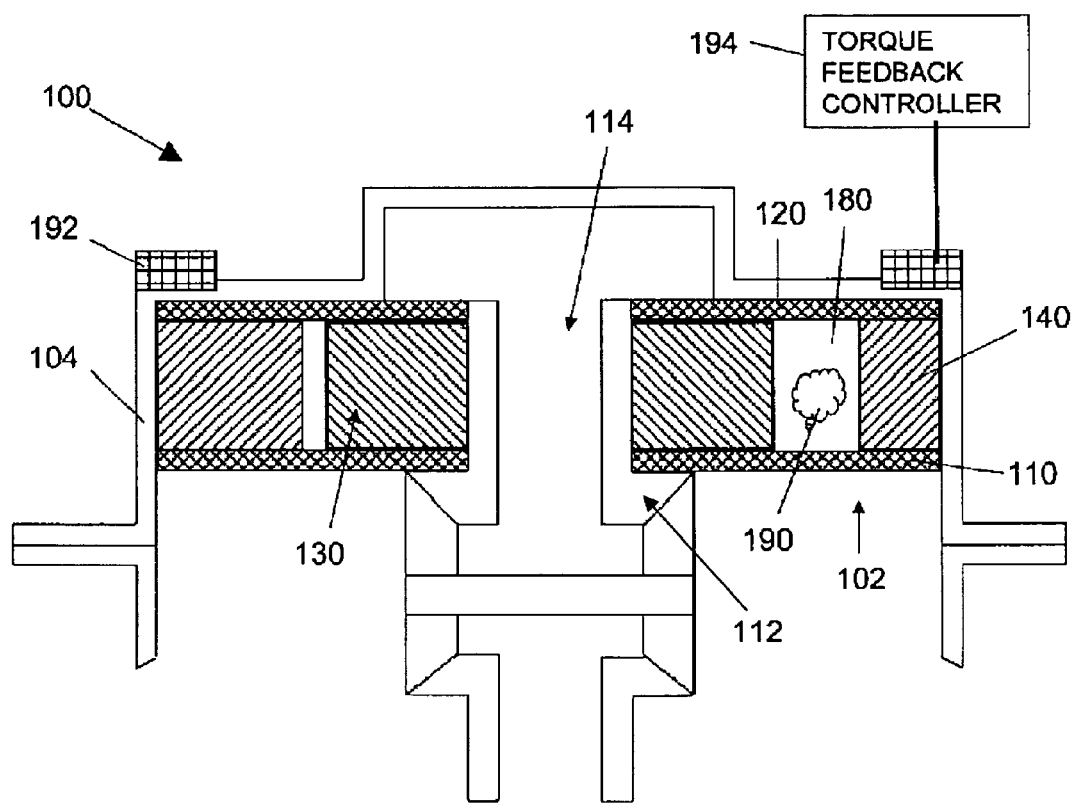
FIG. 1 shows a cross sectional view of one embodiment of an active torque biasing differential, in accordance with the present invention.

FIG. 1 shows a cross sectional view of one embodiment of an active torque biasing differential 100, in accordance with the present invention. An active torque biasing differential is utilized in applications benefiting from biasing the degree of applied torque such as mobile vehicles, machining tools, etc. In mobile vehicles, the active torque biasing differential 100 may be used in connection with transmissions, all wheel drive units, transfer case units and axles.

The active torque biasing differential 100 is described as a component of a mobile vehicle differential unit (not shown). The active torque biasing differential 100 includes a housing 102. In one embodiment, housing 102 is formed by a first cover plate 110, a second cover plate 120 and an outer annulus 140. Housing 102 is disposed within a differential case 104 of a mobile vehicle differential unit and is shown affixed to the differential case 104. In another embodiment, outer annulus 140 is an integral part of differential case 104.

An inner annulus 130 is contained within outer annulus 140 and slidably contacts first cover plate 110 and second cover plate 120. A chamber 180 is bounded by inner annulus 130 and outer annulus 140, first cover plate 110, and second cover plate 120. A side gear 112 extends through an opening 114 disposed in first cover plate 110 and is operably connected to a center portion of inner annulus 130. Side gear 112 allows connection of the inner annulus 130 to the differential pinion gears of a mobile vehicle differential unit. Inner annulus 130 rotates about an axis extending through the centerline of side gear 112 in response to rotation of the side gear of the mobile vehicle differential unit.

A magnetorheological fluid 190 is contained within chamber 180. Magnetorheological fluid 190 is a suspension of magnetic particles in a carrier fluid where the viscosity changes reversibly in response to a magnetic field. Specifically, viscosity increases in response to an increase in the magnetic field strength and decreases as the magnetic field strength decreases. The change in viscosity is proportional to the strength of the applied magnetic field. For example, a typical magnetorheological fluid can change consistency from that of a liquid to that of a semi-solid, and back, with response times on the order of milliseconds. An electrorheological fluid, where viscosity responds to the strength of an electric field, may be used in place of magnetorheological fluid 190.

A field producing coil, such as electromagnetic coil 192, is placed to apply a magnetic field to chamber 180 and is shown connected to differential case 104. Electromagnetic coil 192 generates a magnetic field as electrical current is supplied to it. The strength of the electromagnetic field is proportional to the amount of current supplied to the electromagnetic coil 192. A torque feedback controller 194 is used to control the current supplied to electromagnetic coil 192.

Torque feedback controller 194 is a programmable controller, such as a microcontroller, coupled to the electromagnetic coil 192 that monitors the torque difference across the active torque biasing differential 100. The torque feedback controller 194 regulates the current supplied to the electromagnetic coil 192 in response to the measured torque difference. The torque feedback controller 194 can be an integral component in a vehicle control system, such as a stability control system or an ABS system.

Figure 2:
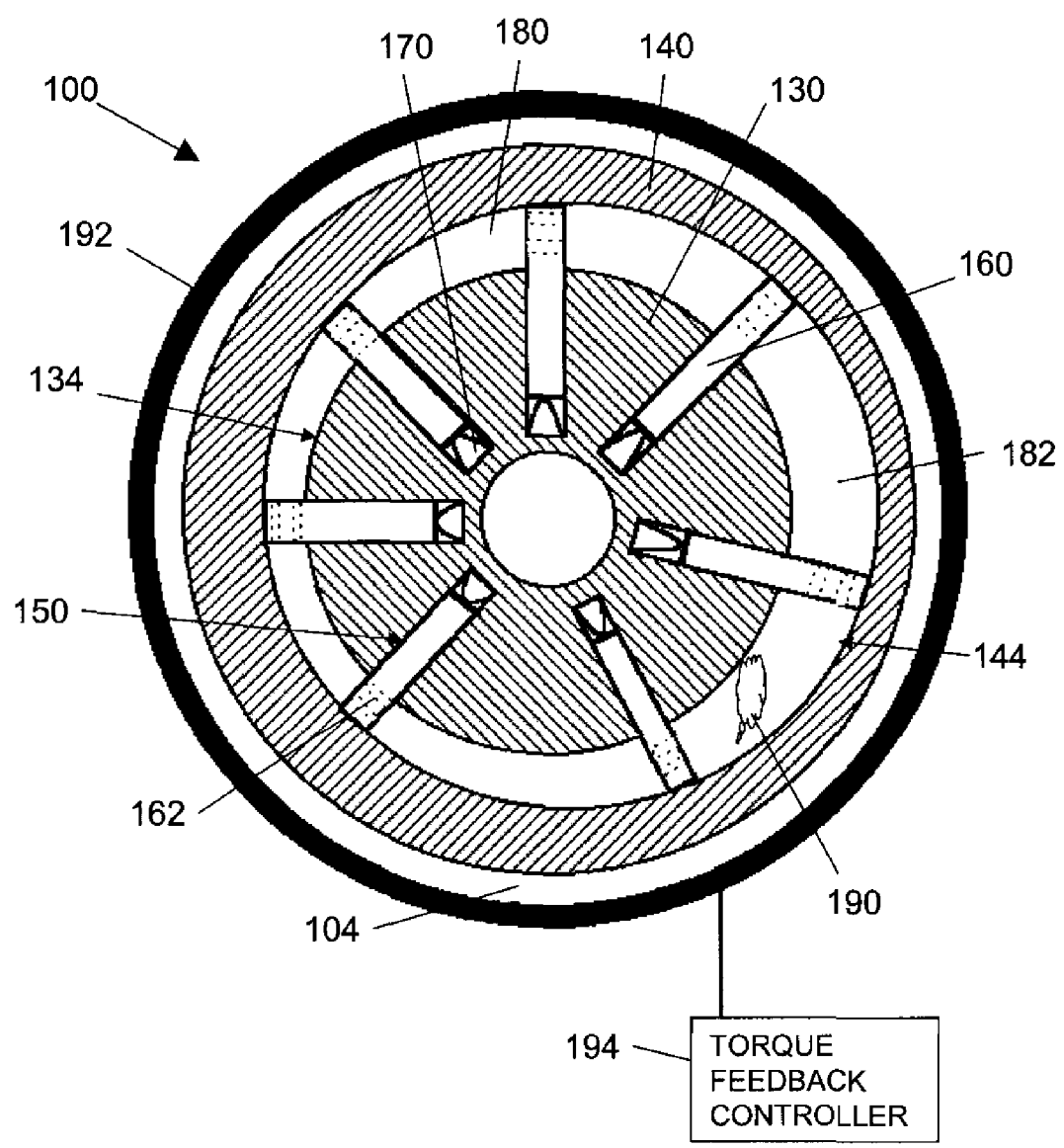
FIG. 2 shows a top view of one embodiment of an active torque biasing differential (cover not shown), in accordance with the present invention.

FIG. 2 is a top view of one embodiment of the active torque biasing differential 100 in accordance with the present invention. Inner annulus 130 is contained within outer annulus 140, which is contained within differential case 104.

A plurality of slots 150 are formed in an outer circumference 134 of inner annulus 130. In one embodiment, slots 150 are machined in to the outer circumference 134 of inner annulus 130. A biasing member, such as a spring 170, is disposed within each of the slots 150. A plurality of vanes 160 having at least one orifice 162 formed therein are disposed in slots 150. Each vane 160 includes a first end configured to rest on spring seat 170, and a second end disposed opposite the first end and the second end configured to contact an inside circumference 144 of outer annulus 140. Vanes 160 are coaxial with a centerline of slots 150 and configured to freely slide along the centerline. Spring 170 biases vanes 160 in slots 150 thereby keeping second end of vane 160 in contact with outer annulus 140.

Chamber 180 is divided into a plurality of sub-chambers 182 by vanes 160. A quantity of a magnetorheological fluid 190 is contained in chamber 180. In one embodiment, the profile of the inside circumference 144 of the outer annulus 140 is elliptical such that the volume of each sub-chamber 182 varies continuously as the inner annulus 130 rotates relative to outer annulus 140. In another embodiment, the outside circumference 134 of the inner annulus 130 is elliptical and the inside circumference 144 of the outer annulus 140 is circular. In another embodiment, the outside circumference 134 of the inner annulus 130 and the inside circumference 144 of the outer annulus 140 are both circular but non-concentric. Other embodiments may utilize additional inner/outer annulus profiles. In each of these and other potential embodiments, the volume of each sub-chamber 182 varies as the inner annulus 130 rotates relative to the outer annulus 140.

As inner annulus 130 rotates relative to outer annulus 140, magnetorheological fluid 190 flows from each sub-chamber 182 to the adjacent sub-chamber 182 through orifices 162 in vanes 160. As the rotational velocity of the inner annulus 130 increases relative to the outer annulus 140, the fluid pressure within the chambers 180 increases, thereby increasing the flow rate of the magnetorheological fluid 190 between adjacent sub-chambers 182. The increasing pressure caused by the increased flow of the magnetorheological fluid 190 through the orifices 162 provides a degree of initial torque bias. Initial torque bias can be tuned by varying the size and number of the orifices 162.

Additional torque bias is supplied by increasing the viscosity of the magnetorheological fluid 190. As the viscosity of the magnetorheological fluid 190 increases, the pressure required to force the magnetorheological fluid 190 through the orifices 162 increases thereby increasing the torque differential across the unit. The torque bias ratio varies based on the actual viscosity of the magnetorheological fluid 190. As the viscosity of magnetorheological fluid 190 increases the torque bias ratio increases. For example, when one wheel of a vehicle is slipping and the opposite wheel has traction, an increase in the viscosity of magnetorheological fluid slows the wheel that is slipping. This results in an increasing proportion of the torque being directed to the wheel having traction. The minimal response time of the magnetorheological fluid 190 results in an active torque biasing differential 100 that is capable of going from an open differential condition to a nearly locked differential condition almost instantaneously.

Torque feedback controller 194 responds to a traction event by increasing the current through electromagnetic coil 192 thereby increasing the strength of the magnetic field applied to chamber 180. Magnetorheological fluid 190 responds to the increasing magnetic field by increasing in viscosity.

Figure 3:
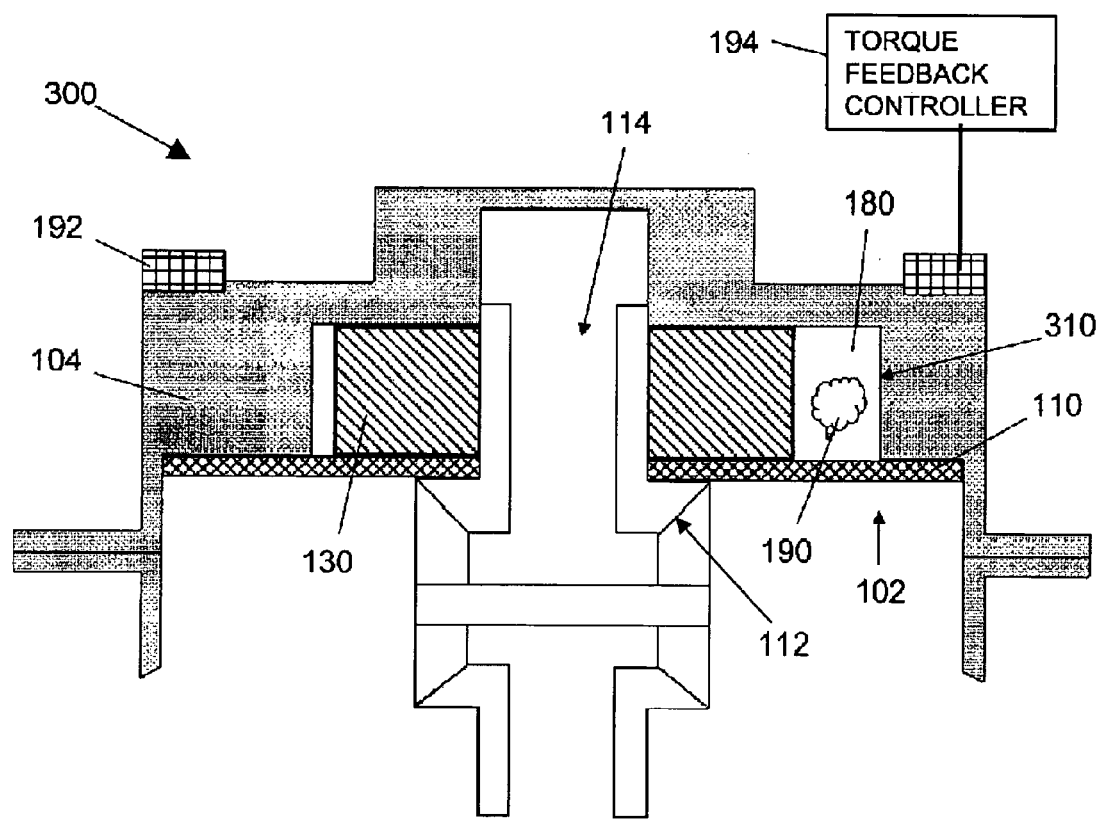
FIG. 3 shows a cross sectional view of a first alternate embodiment of an active torque biasing differential, in accordance with the present invention.

FIG. 3 shows a cross-sectional view of a first alternate embodiment of an active torque biasing differential 300. Active torque biasing differential 300 operates substantially as described in FIG. 1 and FIG. 2. A non-circular cavity 310 is formed within differential case 104. Inner annulus 130 is contained within non-circular cavity 310. First cover plate 110 is disposed over and slidably contacts inner annulus 130. First cover plate is disposed within differential case 104 fully covering non-circular cavity 310. Housing 102 is defined by differential case 104 and first cover plate 110. A chamber 180 is bounded by inner annulus 130, differential case 104, and first cover plate 110 and contains a quantity of magnetorheological fluid 190.

A side gear 112 extends through an opening 114 disposed in first cover plate 110 and is operably connected to a center portion of inner annulus 130. Side gear 112 allows connection of the inner annulus 130 to the differential pinions of a mobile vehicle differential unit. Inner annulus 130 rotates about an axis extending through the centerline of side gear 112

An electromagnetic coil 192 is placed to apply a magnetic field to chamber 180 and is shown connected to differential case 104. Electromagnetic coil 192 generates a magnetic field as electrical current is supplied to it. The strength of the electromagnetic field is proportional to the amount of current supplied to the electromagnetic coil 192. A torque feedback controller 194 is used to control the current supplied to electromagnetic coil 192.

Figure 4:
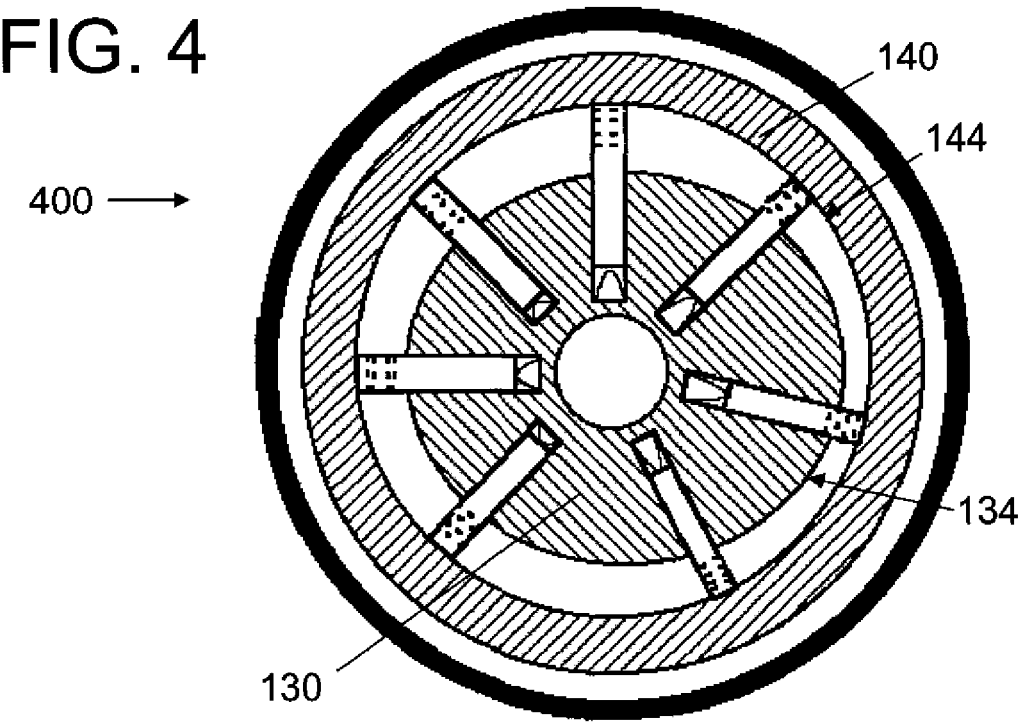
FIG. 4 shows a top view of a second alternate embodiment of an active torque biasing differential (cover not shown), in accordance with the present invention.

FIG. 4 shows a top view of a second alternate embodiment of an active torque biasing differential 400 where the outside circumference 134 of the inner annulus 130 has a non-circular profile, such as an ellipse, and the inside circumference 144 of the outer annulus 140 is circular.

Figure 5:
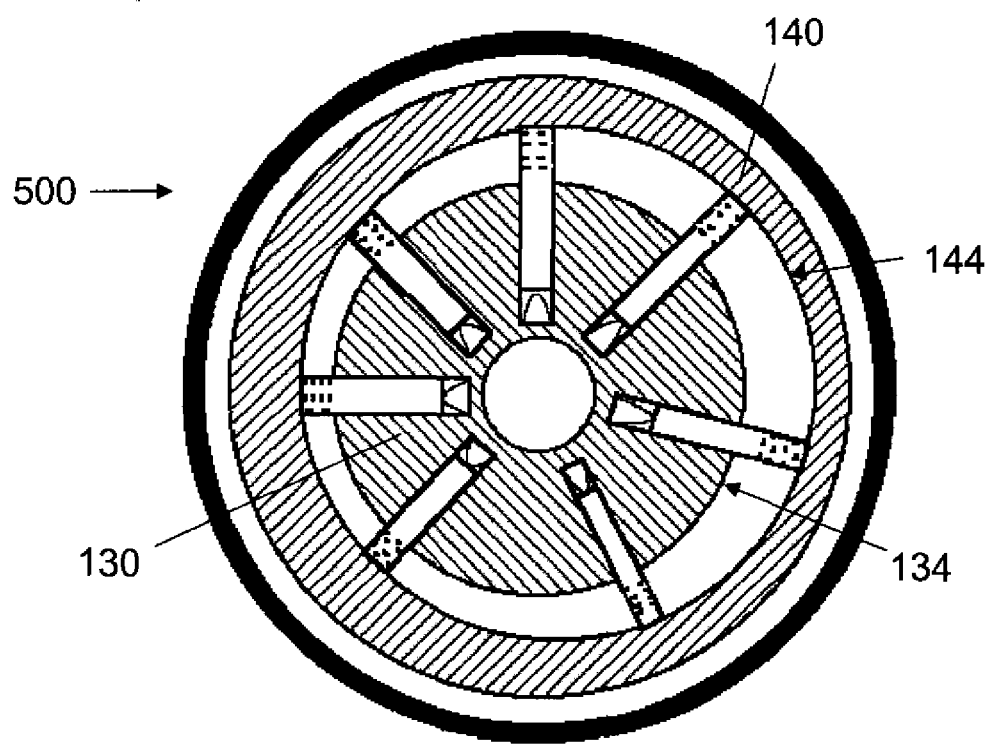
FIG. 5 shows a top view of a third alternate embodiment of an active torque biasing differential (cover not shown), in accordance with the present invention.

FIG. 5 shows a top view of a third alternate embodiment of an active torque biasing differential 500 where the outside circumference 134 of the inner annulus 130 and the inside circumference 144 of the outer annulus 140 are both circular. Inner annulus 130 and outer annulus 140 are non-concentric.

Figure 6:
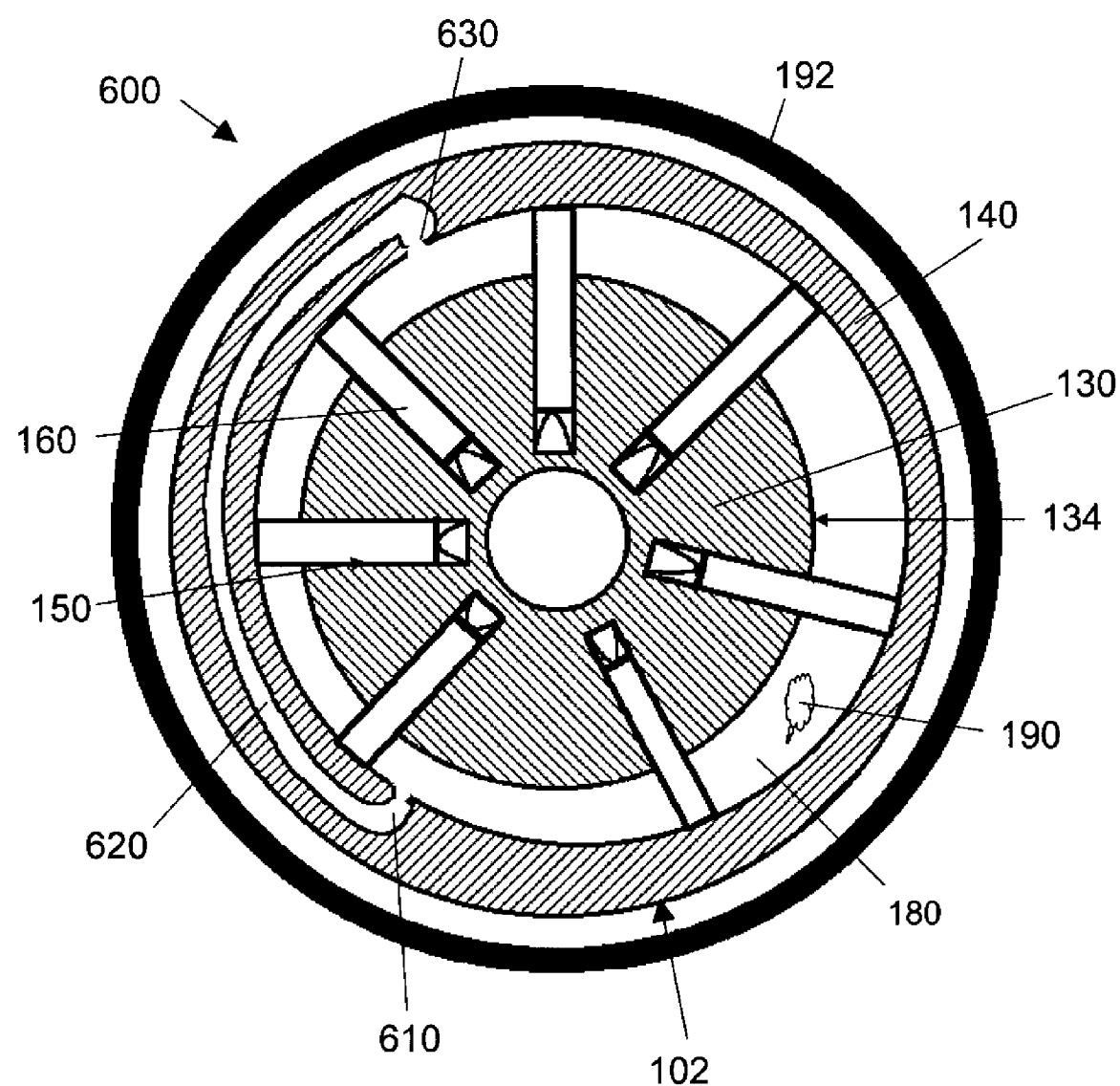
FIG. 6 shows a top view (cover not shown), of a fourth alternate embodiment of an active torque biasing differential, in accordance with the present invention.

FIG. 6 shows a cross sectional view of a fourth alternate embodiment of an active torque biasing differential 600, in accordance with the present invention. Vanes 160 are solid having no orifices. Vanes 160 are inserted in slots 150 in outside circumference 134 of inner annulus 130. Chamber 180 is bounded by inner annulus 130 and outer annulus 140 and contains a quantity of magnetorheological fluid 190. A plenum 620 may be formed in either outer annulus 140 or inner annulus 130. Plenum 620 is in fluidic communication with chamber 180 and includes at least one discharge orifice 610 and at least one return orifice 630.

As inner annulus 130 rotates relative to outer annulus 140, vanes 160 force magnetorheological fluid 190 through discharge orifice 610 and into plenum 620. Magnetorheological fluid 190 returns to chambers 180 through return orifice 630. Varying the size of the discharge orifice 610 and the return orifice 630 allows tuning of the initial torque bias provided by the active torque biasing differential 600.

An electromagnetic coil 192 is placed to apply a magnetic field to chamber 180 and is shown connected to differential case 104. As described in FIG. 1 above, magnetorheological fluid increases in viscosity in the presence of a magnetic field. As the viscosity of the magnetorheological fluid 190 increases, the pressure required to force the magnetorheological fluid 190 through discharge orifice 610, plenum 620, and return orifice 630 increases, thereby increasing the torque differential across the active torque biasing differential 600.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An active torque biasing differential comprising:
   a differential case;
   a shaft;
   a housing;
   an outer annulus disposed within the housing and in operable communication with one of the differential case and shaft;
   an inner annulus contained within the outer annulus, the inner annulus including a plurality of slots formed therein and in operable communication with the other one of the differential case and shaft;
   a plurality of vanes each disposed within a corresponding one of the plurality of slots formed in the inner annulus and slidably contacting the other one of the inner annulus and outer annulus, the vanes each including at least one orifice formed therein;
   a field producing coil placed to apply one of a magnetic field and an electric field to a chamber defined by the outer annulus and inner annulus that is divided into a plurality of sub-chambers by the vanes;
   a magnetorheological or electrorheological fluid disposed within the chamber; and
   wherein relative movement between the outer annulus and inner annulus causes magnetorheological or electrorheological fluid in one sub-chamber to flow into an adjacent sub-chamber through the at least one orifice in the vane that is disposed therebetween.

2. The active torque biasing differential of claim 1 wherein the housing comprises a first cover plate disposed over a first side of the outer annulus; and a second cover plate disposed over a second opposite side of the outer annulus wherein the inner annulus slidably contacts the first cover plate and the second cover plate.

3. The active torque biasing differential of claim 1 wherein each one of the plurality of sub-chambers is bounded by the inner annulus, the outer annulus, and the plurality of vanes with each sub-chamber being of variable volume construction such that the volume of each sub-chamber varies during relative movement between the outer annulus and inner annulus.

4. The active torque biasing differential of claim 1 wherein the outer annulus is an integral part of the housing.

5. The active torque biasing differential of claim 4 wherein the outer annulus is integrally formed of the differential case.

6. The active torque biasing differential of claim 1 wherein the inner annulus is non-concentric with the outer annulus.

7. The active torque biasing differential of claim 1 wherein an inner circumference of the outer annulus is non-circular.

8. The active torque biasing differential of claim 1 wherein an outer circumference of the inner annulus is non-circular.

9. The active torque biasing differential of claim 1 wherein the shaft comprises a gear that is directly connected to the inner annulus.

10. The active torque biasing differential of claim 1 further comprising a biasing element disposed in each slot between a corresponding one of the vanes received in the slot and the inner annulus in which the slot is formed.

11. The active torque biasing differential of claim 1, further comprising a torque feedback controller operably connected to the field producing coil.

12. An active torque biasing differential comprising:
an outer differential case;
a side gear;
a housing in operable communication with the differential case and the side gear;
an outer annulus disposed within the housing and operatively connected to the differential case;
an inner annulus disposed within the outer annulus, the inner annulus (i) operatively connected to the side gear, (ii) including a plurality of slots formed therein and (iii) capable of relative rotation with the outer annulus;
a plurality of vanes disposed within slots of the inner annulus and slidably contacting the outer annulus;
a chamber formed between the inner annulus and the outer annulus that is divided by the vanes into a plurality of sub-chambers each having a volume;
a magnetorheological or an electrorheological fluid received in the chamber;
a field producing coil placed to apply a magnetic or electric field to the magnetorheological or electrorheological fluid received in the chamber; and
wherein relative rotation between the outer annulus and the inner annulus varies the volume of each sub-chamber causing magnetorheological or electrorheological fluid disposed in one of the sub-chamber to flow into another one of the sub-chambers; and
wherein application of one of a magnetic and electric field changes the viscosity of the magnetorheological or electrorheological fluid changing a torque bias ratio of the active torque biasing differential.

13. The active torque biasing differential of claim 12 wherein each one of the vanes has an orifice formed therein that is in fluid flow communication with a plurality of adjacent sub-chambers and wherein magnetorheological or electrorheological fluid flows from one of the adjacent sub-chambers to the other one of the adjacent sub-chambers during relative rotation between the outer annulus and the inner annulus.

14. The active torque biasing differential of claim 12 wherein further comprising a plenum formed within one of the outer annulus and the inner annulus wherein the plenum is in fluidic communication with a plurality of the sub-chambers.

15. The active torque biasing differential of claim 12 wherein the inner annulus is non-concentric with the outer annulus.

16. The active torque biasing differential of claim 12 wherein an inner profile of the outer annulus is non-circular.

17. The active torque biasing differential of claim 12 wherein an outer profile of the inner annulus is non-circular.

18. An active torque biasing differential comprising:
an outer annulus operatively coupled to one of a plurality of torque communicating elements,
an inner annulus contained within the outer annulus operatively coupled to the other one of the torque communicating elements with the inner annulus having at least one slot formed therein,
at least one vane disposed in the at least one slot formed in the inner annulus and extending radially outwardly so as to contact the outer annulus with the at least one vane movable in the slot radially relative to the inner annulus,
a spring in the at least slot formed in the inner annulus biasing the at least one vane keeping the at least one vane in contact with the outer annulus,
a fluid disposed in a chamber defined by the space between the outer annulus and the inner annulus;
a field producing coil for modifying the viscosity of the fluid;
wherein relative rotation between the outer annulus and the inner annulus causes the space between the outer annulus and inner annulus defining the chamber therebetween to vary, and
wherein the fluid is a magnetorheological fluid, one of the torque communicating elements comprises a housing, the other one of the torque communicating elements comprises a side gear, the at least one vane divides the chamber into a pair of adjacent sub-chambers, and there is an orifice in the at least one vane permitting magnetorheological fluid flow though the orifice between adjacent sub-chambers during relative rotation between the outer annulus and the inner annulus.

* * * * *